(12) United States Patent
Kim et al.

(10) Patent No.: US 8,873,621 B2
(45) Date of Patent: Oct. 28, 2014

(54) METHOD, MEDIUM, AND APPARATUS FOR ENCODING AND/OR DECODING VIDEO BY GENERATING SCALABLE BITSTREAM

(75) Inventors: Dae-hee Kim, Suwon-si (KR); Dae-sung Cho, Seoul (KR); Woong-il Choi, Hwaseong-si (KR); Hyun-mun Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1447 days.

(21) Appl. No.: 12/076,125

(22) Filed: Mar. 13, 2008

(65) Prior Publication Data

US 2009/0074060 A1    Mar. 19, 2009

(30) Foreign Application Priority Data

Sep. 14, 2007    (KR) .................. 10-2007-0093904

(51) Int. Cl.
*H04N 21/2389*    (2011.01)
*H04N 19/70*    (2014.01)
*H04N 21/2343*    (2011.01)
*H04N 19/36*    (2014.01)
*H04N 21/438*    (2011.01)
*H04N 19/126*    (2014.01)
*H04N 21/2383*    (2011.01)
*H04N 19/186*    (2014.01)
*H04N 21/647*    (2011.01)
*H04N 19/30*    (2014.01)
*H04N 19/187*    (2014.01)

(52) U.S. Cl.
CPC . *H04N 21/234354* (2013.01); *H04N 19/00884* (2013.01); *H04N 19/00448* (2013.01); *H04N 21/4382* (2013.01); *H04N 19/00096* (2013.01); *H04N 21/2383* (2013.01); *H04N 21/234327* (2013.01); *H04N 19/00315* (2013.01); *H04N 21/64792* (2013.01); *H04N 19/00424* (2013.01); *H04N 19/00321* (2013.01)
USPC .................................................. 375/240.03

(58) Field of Classification Search
USPC ..................................................... 375/240.03
See application file for complete search history.

(56) References Cited

U.S. PATENT DOCUMENTS

2002/0009141 A1*    1/2002    Yamaguchi et al. ...... 375/240.11
2005/0111543 A1*    5/2005    Seo ............................. 375/240.2

(Continued)

FOREIGN PATENT DOCUMENTS

WO        WO 01/69936 A2        9/2001
WO        WO 2007/081752 A2    7/2007

OTHER PUBLICATIONS

Winken, Martin, et al., CE2: SVC bit-depth scalable coding, JVT of ISO/IEC MPEG & ITU-T VCEG (Jun./Jul. 2007).*

(Continued)

*Primary Examiner* — Benjamin Lamont
(74) *Attorney, Agent, or Firm* — Staas & Halsey LLP

(57) ABSTRACT

A method, medium, and apparatus for encoding and/or decoding video by generating a scalable bitstream formed of a base layer bitstream and an enhancement layer bitstream so as to have forward compatibility, wherein the enhancement layer bitstream comprises a bit-depth field of the enhancement layer, a frame or a picture type field of the enhancement layer in consideration of a frame or a picture type of the base layer, an additional quantization information field for obtaining a quantization parameter of the enhancement layer together with a quantization parameter of the base layer, an intra-macroblock field of the enhancement layer, and an inter-macroblock field of the enhancement layer.

26 Claims, 12 Drawing Sheets

(56) References Cited

U.S. PATENT DOCUMENTS

| | | | |
|---|---|---|---|
| 2005/0259729 A1 | 11/2005 | Sun | |
| 2006/0153295 A1* | 7/2006 | Wang et al. | 375/240.08 |
| 2006/0165304 A1* | 7/2006 | Lee et al. | 382/240 |
| 2007/0025628 A1* | 2/2007 | Sekiguchi et al. | 382/239 |
| 2007/0147497 A1* | 6/2007 | Bao et al. | 375/240.03 |
| 2007/0280349 A1* | 12/2007 | Prieto et al. | 375/240.03 |
| 2008/0056352 A1* | 3/2008 | Kim et al. | 375/240.03 |
| 2010/0020866 A1* | 1/2010 | Marpe et al. | 375/240.02 |
| 2010/0135393 A1* | 6/2010 | Ying Gao et al. | 375/240.15 |
| 2010/0272185 A1* | 10/2010 | Gao et al. | 375/240.18 |

OTHER PUBLICATIONS

PCT International Search Report and Written Opinion of the International Searching Authority mailed Jan. 9, 2009 in corresponding International Application No. PCT/KR2008/003919.

Extended European Search Report mailed Jun. 24, 2013 in corresponding European Application No. 08778583.8.

Peter Amon et al., "SNR Scalable Layered Video Coding", International Workshop on Packet Video, Apr. 24, 2002, pp. 1-8.

Thomas Wiegand et al., "Joint Draft 8 of SVC Amendment", Joint Video Team (JVT) of ISO/IEC MPEG & ITU-T VCEG, $21^{st}$ Meeting, Draft ISO/IEC 14496-10 (2006), Oct. 2006, pp. 1-530.

Andrew Segall, "Scalable Coding of High Dynamic Range Video", Image Processing, ICIP 2007, IEEE, Sep. 1, 2007, pp. 1-4.

Yuwen Wu et al., "Bit Depth Scalable Coding", Multimedia and Expo, 2007 IEEE, ICME 2007, Jul. 1, 2007, pp. 1139-1142.

A. Tanju Erdem et al., "Compression of 10-bit Video Using the Tools of MPEG-2", Signal Processing: Image Communication, Elsevier Science Publishers, vol. 7, Mar. 1, 1995, pp. 27-56.

Barry G. Hasell et al., "Digital Video: An Introduction to MPEG-2", Digital Multimedia Standards Series, Jan. 1, 1999, pp. 183-202.

Martin Winken et al., "Bit-Depth Scalable Video Coding", Image Processing, ICIP 2007, IEEE, Sep. 1, 2007, pp. 5-8.

Korean Office Action issued Sep. 23, 2013 in corresponding Korean Patent Application No. 10-2007-006670.

Korean Office Action issued Sep. 23, 2013 in corresponding Korean Patent Application No.10-2007-0093904.

* cited by examiner

| ENHANCEMENT_SEQUENCE_LAYER() { | Coding Type | Reference |
|---|---|---|
| BIT_DEPTH | FLC | (601) |
| if (ExistMoreYUV_FORMAT_E()) { | | (602) |
| YUV_FORMAT | FLC | (603) |
| } | | (604) |
| for('all pictures') { | | (605) |
| ENHANCEMENT_PICTURE_LAYER() | | (606) |
| } | | (607) |
| } | | |

| ENHANCEMENT_PICTURE_LAYER { | Coding Type | Reference |
|---|---|---|
| PTYPE_E | VLC | (801) |
| ADDTIONAL_PQINDEX | FLC | (802) |
| for('all macrobloks') { | | (803) |
| if(PTYPE_E == 'Intra Picture'){ | | (804) |
| ENHANCEMENT_INTRA_MB() | | (805) |
| } | | (806) |
| else { | | (807) |
| ENHANCEMENT_INTER_MB() | | (808) |
| } | | (809) |
| } | | (810) |
| } | | |

| ENHANCEMENT_INTRA_MB    { | Coding Type | Reference |
|---|---|---|
| CBPCY_E | VLC | (1001) |
| for('all bloks in MB') { | | (1002) |
| if('coded intra-block') { | | (1003) |
| ENHANCEMENT_INTRA_BLOCK() | | (1004) |
| } | | (1005) |
| } | | (1006) |
| } | | |

| ENHANCEMENT_INTER_MB () { | Coding Type | Reference |
|---|---|---|
| MB_SKIP_E | FLC | (1201) |
| if(!MB_SKIP_E) { | | (1202) |
| CBPCY_E | VLC | (1203) |
| for('all blocks in MB') { | | (1204) |
| if('coded intra-block'){ | | (1205) |
| ENHANCEMENT_INTRA_BLOCK() | | (1206) |
| } | | (1207) |
| else if('coded inter-block) { | | (1208) |
| ENHANCEMENT_INTER_BLOCK () | | (1209) |
| } | | (1210) |
| } | | (1211) |
| } | | (1212) |
| } | | |

| ENHANCEMENT_INTRA_MB () { | Coding Type | Reference |
|---|---|---|
| for('all coefficeints in a block except for DC'){ | | (1401) |
| intra_coefficients() | | (1402) |
| } | | (1403) |
| } | | |

FIG. 16

| ENHANCEMENT_INTER_BLOCK () { | Coding Type | Reference |
|---|---|---|
| if('not coded base-layer inter-block') { | | (1601) |
| TTBLK_E | VLC | (1602) |
| if(ExistMoreSubblockPatten()){ | | (1603) |
| SUBBLKPAT_E1 | VLC | (1604) |
| } | | (1605) |
| } | | (1606) |
| if(ExistMoreSubblockPatten()){ | | (1607) |
| SUBBLKPAT_E2 | VLC | (1608) |
| } | | (1609) |
| for(i=0; i < SUBBBLKNUM;i++) { | | (1610) |
| if(IsSubBlKCodded(i)) { | | (1611) |
| for('all coefficients in a sub-block') { | | (1612) |
| inter_coefficients() | | (1613) |
| } | | (1614) |
| } | | (1615) |
| } | | (1616) |
| } | | |

METHOD, MEDIUM, AND APPARATUS FOR ENCODING AND/OR DECODING VIDEO BY GENERATING SCALABLE BITSTREAM

CROSS-REFERENCE TO RELATED PATENT APPLICATIONS

This application claims the benefit of Korean Patent Application No. 10-2007-0093904, filed on Sep. 14, 2007, in the Korean Intellectual Property Office, the disclosure of which is incorporated herein in its entirety by reference.

BACKGROUND

1. Field

One or more embodiments of the present invention relates to a video encoding apparatus and method and a video decoding apparatus and method, and more particularly, to a video encoding apparatus and method and a video decoding apparatus and method in which a scalable bitstream supporting at least one encoding parameter from among at least two bit-depths and at least two video formats, and having forward compatibility, is generated or decoded.

2. Description of the Related Art

In an ordinary video codec according to conventional technology, when the bit-depth of a basic encoder such as a VC-1 encoder, is changed from 8 bits to 10 bits, or when the video format of a basic encoder is simply changed from 4:2:0 to 4:2:2 or 4:4:4, it is impossible for a VC-1 decoder to read and reproduce a bitstream which is generated by the improved encoders having the extended bit-depth or the changed video format. Recently, the necessity for development of a video codec which guarantees forward compatibility and allows a VC-1 decoder and other improved decoders to restore a bitstream encoded with a variety of bit-depths or video formats, as well as a fixed bit-depth or fixed video format, has been increasingly highlighted.

That is, since a new video codec, which does not guarantee forward compatibility, cannot support a terminal having only a conventional basic video codec, reuse of digital content in both terminals having specifications that are different from each other becomes impossible. In addition, it will take much time for the new video codec to settle into the market, because the new video codec needs to overcome the already established conventional video codec market.

SUMMARY

One or more embodiments of the present invention provides a video encoding apparatus and method in which a scalable bitstream formed with a base layer bitstream and an enhancement layer bitstream is generated so that the scalable bitstream can support at least one encoding parameter from among at least two bit-depths and at least two video formats and have forward compatibility.

One or more embodiments of the present invention also provides a video decoding apparatus and method in which a scalable bitstream formed with a base layer bitstream and an enhancement layer bitstream is decoded so that the scalable bitstream can support at least one encoding parameter from among at least two bit-depths and at least two video formats and have forward compatibility.

Additional aspects and/or advantages will be set forth in part in the description which follows and, in part, will be apparent from the description, or may be learned by practice of the invention.

According to an aspect of the present invention, there is provided a video encoding method which generates a scalable bitstream formed of a base layer bitstream and an enhancement layer bitstream so as to have forward compatibility, wherein the enhancement layer bitstream comprises: a bit-depth field of the enhancement layer; a frame or a picture type field of the enhancement layer in consideration of a frame or a picture type of the base layer; an additional quantization information field for obtaining a quantization parameter of the enhancement layer together with a quantization parameter of the base layer; an intra-macroblock field of the enhancement layer; and an inter-macroblock field of the enhancement layer.

According to another aspect of the present invention, there is a video encoding apparatus which generates a scalable bitstream formed of a base layer bitstream and an enhancement layer bitstream so as to have forward compatibility, the apparatus comprising: an enhancement layer encoding module, which generates the enhancement layer bitstream comprising a bit-depth field of the enhancement layer, a frame or a picture type field of the enhancement layer in consideration of a frame or a picture type of the base layer, an additional quantization information field for obtaining a quantization parameter of the enhancement layer together with a quantization parameter of the base layer, an intra-macroblock field of the enhancement layer, and an inter-macroblock field of the enhancement layer.

According to another aspect of the present invention, there is provided a video decoding method which decodes a scalable bitstream formed of a base layer bitstream and an enhancement layer bitstream so as to have forward compatibility, the method comprising: receiving the base layer bitstream and decoding video compression data; and receiving the enhancement layer bitstream, decoding a bit-depth field of the enhancement layer, decoding a frame or a picture type field of the enhancement layer encoded in consideration of a frame or a picture type of the base layer, decoding an additional quantization information field for obtaining a quantization parameter of the enhancement layer together with a decoded quantization parameter of the base layer, and decoding an intra-macroblock field of the enhancement layer and an inter-macroblock field of the enhancement layer by using results of the decoding of the base layer bitstream.

According to another aspect of the present invention, there is provided a video decoding apparatus which decodes a scalable bitstream formed of a base layer bitstream and an enhancement layer bitstream so as to have forward compatibility, the apparatus comprising: a base layer decoding module, which receives the base layer bitstream and decodes video compression data; and an enhancement layer decoding module, which receives the enhancement layer bitstream, decodes a bit-depth field of the enhancement layer, decoding a frame or a picture type field of the enhancement layer encoded in consideration of a frame or a picture type of the base layer, decoding an additional quantization information field for obtaining a quantization parameter of the enhancement layer together with a decoded quantization parameter of the base layer, and decodes an intra-macroblock field of the enhancement layer and an inter-macroblock field of the enhancement layer by using results of the decoding of the base layer bitstream.

According to another aspect of the present invention, there is provided a computer readable medium having computer readable code to implement a video encoding method which generates a scalable bitstream formed of a base layer bitstream and an enhancement layer bitstream so as to have forward compatibility, wherein the enhancement layer bitstream comprises: a bit-depth field of the enhancement layer; a frame or a picture type field of the enhancement layer in consideration of a frame or a picture type of the base layer; an additional quantization information field for obtaining a quantization parameter of the enhancement layer together with a quantization parameter of the base layer; an intra-macroblock field of the enhancement layer; and an inter-macroblock field of the enhancement layer.

According to another aspect of the present invention, there is provided a computer readable medium having computer readable code to implement a video decoding method which decodes a scalable bitstream formed of a base layer bitstream and an enhancement layer bitstream so as to have forward compatibility, the method comprising: receiving the base layer bitstream and decoding video compression data; and receiving the enhancement layer bitstream, decoding a bit-depth field of the enhancement layer, decoding a frame or a picture type field of the enhancement layer encoded in consideration of a frame or a picture type of the base layer, decoding an additional quantization information field for obtaining a quantization parameter of the enhancement layer together with a decoded quantization parameter of the base layer, and decoding an intra-macroblock field of the enhancement layer and an inter-macroblock field of the enhancement layer by using results of the decoding of the base layer bitstream.

BRIEF DESCRIPTION OF THE DRAWINGS

These and/or other aspects and advantages will become apparent and more readily appreciated from the following description of the embodiments, taken in conjunction with the accompanying drawings of which:

FIG. 16 is a table for describing a method of forming a bitstream of an encoded inter-block of an enhancement layer, illustrated in FIG. 15 according to an embodiment of the present invention.

DETAILED DESCRIPTION OF THE EMBODIMENTS

Figure 1:
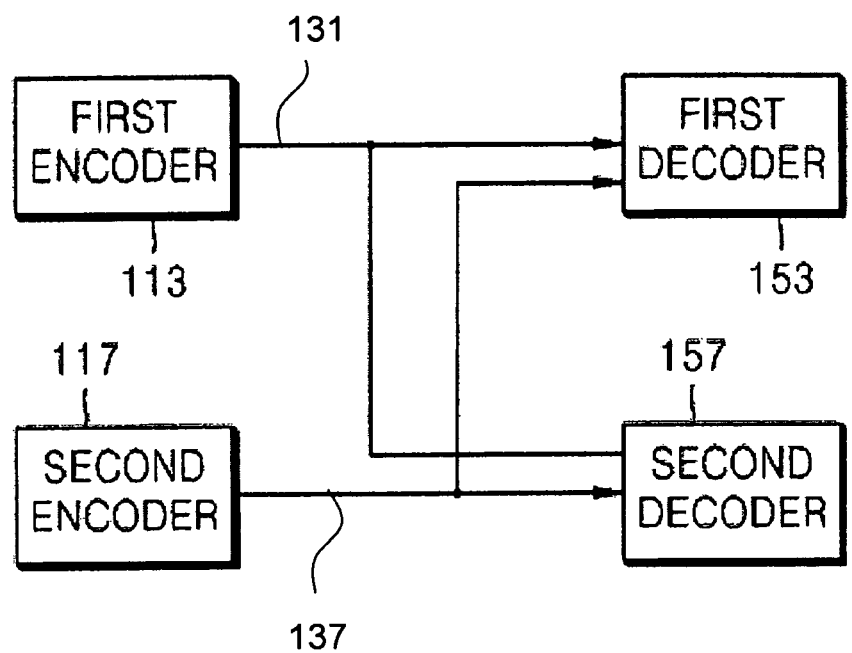
FIG. 1 is a diagram explaining concepts of a video encoding apparatus and video decoding apparatus, according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a diagram explaining concepts of a video encoding apparatus and video decoding apparatus, according to an embodiment of the present invention. As an encoder part, examples of a first encoder 113 performing the role of a basic encoder and a second encoder 117 performing the role of an improved encoder will be explained. As a decoder part, examples of a first decoder 153 performing the role of a basic decoder and corresponding to the first encoder 113, and a second decoder 157 performing the role of an improved decoder and corresponding to the second encoder 117 will be explained. In an embodiment of the present invention, the first encoder 113 generates a bitstream according to a base bit-depth and a first video format, and the second encoder 117 generates a scalable bitstream supporting both the base bit-depth and an extended bit-depth and complying with the first video format. In another embodiment of the present invention, the first encoder 113 generates a bitstream according to the base bit-depth and the first video format, and the second encoder 117 generates a scalable bitstream supporting both the first video format and a second video format and complying with the base bit-depth. In still another embodiment of the present invention, the first encoder 113 generates a bitstream according to the base bit-depth and the first video format, and the second encoder 117 generates a scalable bitstream supporting both the base bit-depth and the extended bit-depth, and both the first and second video formats, or a bitstream supporting both the base bit-depth and the extended bit-depth and both the first video format and a third video format. That is, the second encoder 117 generates a scalable bitstream which can support forward compatibility with at least one from among encoding parameters including bit-depths and video formats, and corresponding to this, the second decoder 157 decodes a scalable bitstream or a non-scalable bitstream.

For convenience of explanation, an example will be given, in which a base bit-depth is 8 bits, an extended bit-depth is 10 bits, a first video format is 4:2:0, a second video format is 4:2:2, and a third video format is 4:4:4. According to the example, a VC-1 encoder supporting 8 bits and a 4:2:0 video format may be employed as the first encoder 113.

Referring to FIG. 1, a bitstream 131 generated in the first encoder 113 can be decoded in the second decoder 157 as well as in the first decoder 153. A scalable bitstream 137 generated in the second encoder 117 can be decoded in the second decoder 157. In the first decoder 153, a base layer bitstream in the scalable bitstream 137 can be decoded in a state in which an enhancement layer bitstream included in the scalable bitstream 137 is ignored. The second encoder 117 which is capable of providing this forward compatibility corresponds to a video encoding apparatus of the present invention, while the second decoder 157 corresponds to a video decoding apparatus of the present invention.

Next, a process of obtaining a scalable bitstream when a bit-depth among a plurality of coding parameters is extended will be explained with reference to FIG. 1.

In an example in which the first encoder 113 is an 8-bit encoder and the second encoder 117 is an N-bit encoder, the start code of the picture level of the enhancement layer bitstream in a scalable bitstream obtained from the second encoder 117 is used to express the remaining part of an extended bit-depth that cannot be expressed by the first encoder 113. For example, it is assumed that the extended bit-depth is N bits and the extended quantization parameter in this case is $QP_N$ and the base bit-depth is 8 bits and the base quantization parameter in this case is $QP_8$. If N-bit original video, i.e. an original video having a bit-depth of N bits is encoded by an 8-bit video codec, i.e. a video codec having a bit-depth of 8 bits, the relationship between the two quantization parameters $QP_N$ and $QP_8$ can be expressed as follows:

$$QP_N = QP_8 \times 2^{(N-8)} \quad (1)$$

That is, the result of quantizing the N-bit original video using the extended quantization parameter $QP_N$ and the result of quantizing the 8-bit original video using the base quantization parameter $QP_8$ must be the same in terms of dynamic range, so that the N-bit original video can be encoded and decoded using a conventional method without changing video codecs. However, in this case, the quality of video restored from the N-bit original video is not greatly different from that of video restored from the 8-bit original video, thus invalidating the advantage of the N-bit original video that provides a high contrast ratio.

In order to rectify this problem, the N-bit original video can be expressed using the base quantization parameter $QP_8$ and the refined quantization parameter R which is an embodiment of additional quantization information, as disclosed in the following Equation (2). Here, in the case of the VC-1 encoder, the extended quantization parameter $QP_N$ or the base quantization parameter $QP_8$ are derived from 'PQINDEX'. By using the refined quantization parameter (R), a smaller extended quantization parameter than the base quantization parameter can be permitted.

$$QP_N = QP_8 \times 2^{(N-8)} + R \quad (2)$$

In an embodiment, R has a value in a range [−3, 0]. In this case, if $QP_8$ has a value in a range [1, 31], $QP_N$ has a value in a range [1, $2^{(N-8)} \times 31$]. That is, if a base quantization parameter $QP_8$ is given in relation to a refined quantization parameter (R) having a predetermined range, an extended quantization parameter $QP_N$ and the refined quantization parameter (R) can be calculated using Equation (2). In this case, although the minimum values of the base quantization parameter $QP_8$ and the extended quantization parameter $QP_N$ are identical and equal to 1, a high contrast ratio can be provided by using a relatively smaller value for the extended quantization parameter $QP_N$.

A base layer bitstream is formed of data obtained by quantizing the N-bit original video by using the base quantization parameter expressed in Equation (1). An enhancement layer bitstream is formed of data obtained by quantizing the N-bit original video by using the extended quantization parameter expressed in Equation (2). Then a scalable bitstream is obtained by combining the base layer bitstream and the enhancement layer bitstream. In this case, in order to reduce the amount of data which is transmitted as an enhancement layer bitstream, an enhancement layer bitstream can be formed from a quantization level which is predicted from a quantization level used for a base layer bitstream. The scalable bitstream can be decoded by not only the existing 8-bit decoder but also by an N-bit decoder.

A process of obtaining a scalable bitstream when a video format among a plurality of coding parameters is extended will now be explained with reference to FIG. 1.

When video formats of the first encoder 113 and the second encoder 117 are different from each other, a concept of spatial scalability is applied, thereby generating a scalable bitstream. For example, when a base video format of the first encoder 113 is 4:2:0 and an extended video format of the second encoder 117 is 4:2:2, filtering of a chrominance component in a 4:2:2 video is performed, thereby dividing the chrominance component into a low frequency band value and a high frequency band value. Then, a 4:2:0 video is reconstructed by using the chrominance component of the low frequency band value and a luminance component. Meanwhile, without performing the filtering, a 4:2:0 video can be reconstructed by performing down-sampling of a chrominance component. The reconstructed 4:2:0 video is encoded in, for example, a 4:2:0 video encoder such as the first encoder 113, included in the second encoder 117, and forms a base layer bitstream as 4:2:0 compression data. Meanwhile, in the 4:2:2 video encoder included in the second encoder 117, a chrominance image formed by the chrominance component of the high frequency band value is encoded, thereby forming an enhancement layer bitstream. As another example, when the video format supported by the first encoder 113 and the first decoder 153 is 4:2:0 and the video format supported by the second encoder 153 and the second decoder 157 is 4:4:4, the same principle is also applied. A base layer bitstream and an enhancement layer bitstream are encoded together with a coded block pattern (CBP). The CBP which is used when a base layer bitstream is generated is formed by 6 bits for a 4:2:0 video format, 8 bits for a 4:2:2 video format, and 12 bits for a 4:4:4 video format. Meanwhile, a CBP which is used when an enhancement layer bitstream is generated is formed by 2 bits for a 4:2:2 video format and 4 bits for a 4:4:4 video format, because an encoding process is performed in relation to only a chrominance image.

Figure 2:
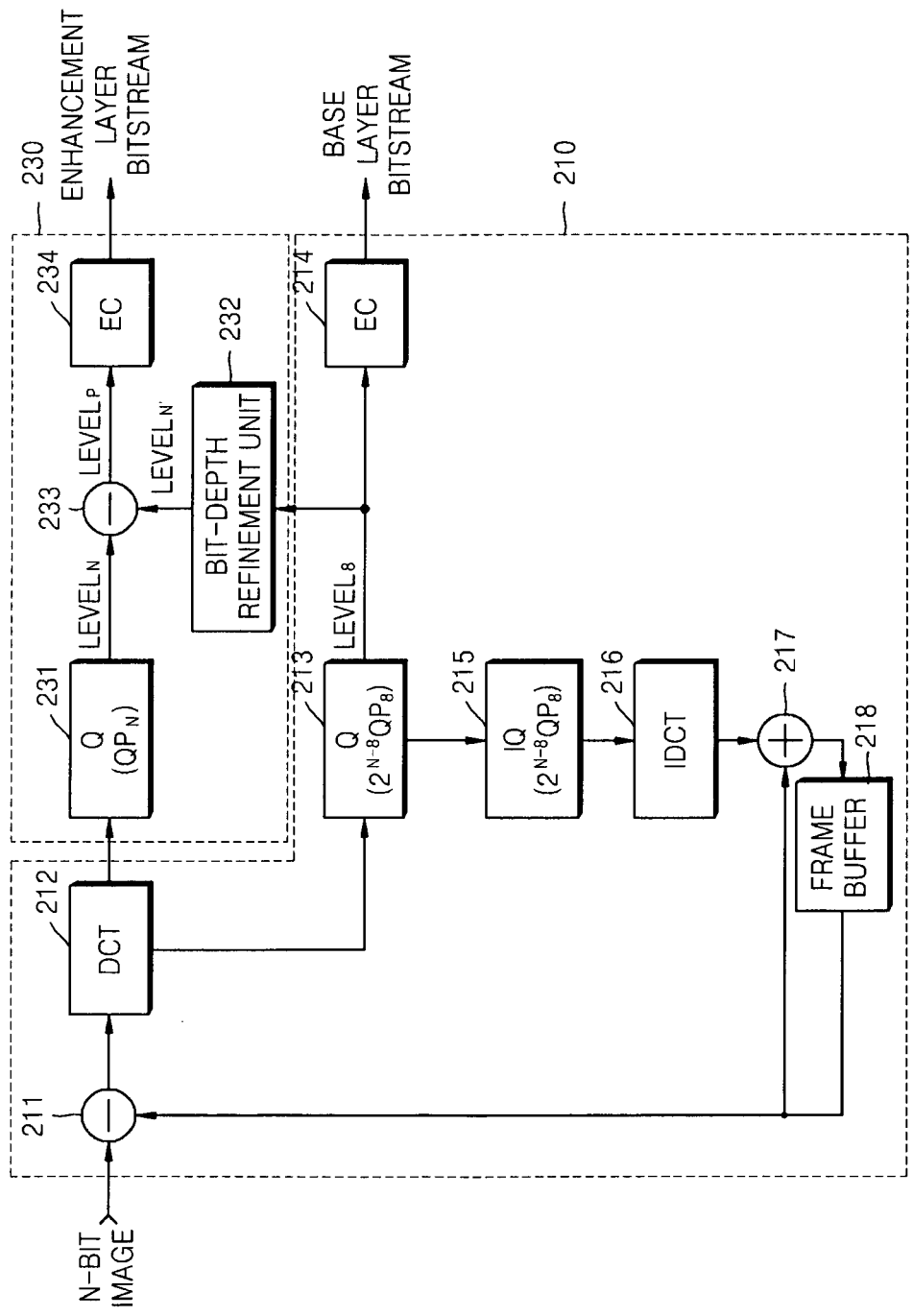
FIG. 2 is a block diagram illustrating a video encoding apparatus according to an embodiment of the present invention.

FIG. 2 is a block diagram illustrating a video encoding apparatus according to an embodiment of the present invention. The video encoding apparatus may include a base layer encoding module 210 and an enhancement layer encoding module 230. The base layer encoding module 210 may include a subtraction unit 211, a transform unit 212, a quantization unit 213, an entropy encoding unit 214, an inverse quantization unit 215, an inverse transform unit 216, an addition unit 217, and a frame buffer 218. The enhancement layer encoding module 230 may include a quantization unit 231, a bit-depth refinement unit 232, a subtraction unit 233, and an entropy encoding unit 234. Each element of the base layer encoding module 210 and the enhancement layer encoding module 230 can be implemented as at least one processor (not shown) by integrating each module into at least one module. Alternatively, the base layer encoding module 210 and the enhancement layer encoding module 230 may be integrated in order to implement one processor (not shown).

Referring to FIG. 2, the transform unit 212 generates transformation coefficients for a residue between an N-bit restored video which is obtained by temporal/spatial prediction of an N-bit reference video, and an N-bit original video. In other words, a loop formed of the subtraction unit 211, the transform unit 212, the quantization unit 213, the inverse quantization unit 215, the inverse transform unit 216, the addition unit 217, and the frame buffer 218 has the same structure as a general video codec.

The quantization unit 213 quantizes a transformation coefficient provided by the transform unit 212 with a quantization parameter ($2^{N-8} QP_8$) obtained by multiplying a base quantization parameter ($QP_8$) by $2^{N-8}$ as shown in Equation 1. The entropy encoding unit 214 entropy-encodes the quantized transformation coefficient, that is, a base quantization level ($LEVEL_8$), thereby generating a base layer bitstream. More specifically, assuming that the transformation coefficient is coef, the base quantization level ($LEVEL_8$) can be expressed as given by Equation 3 below.

$$LEVEL_8 = \frac{\text{abs}(coef) + QP_8 \times 2^{(N-9)}}{QP_8 \times 2^{(N-8)}} \quad (3)$$

The base quantization level ($LEVEL_8$) obtained from Equation 3 is directly entropy-encoded so that it can be restored in a general 8-bit video codec, and then, the result is transmitted as a base layer.

Regarding the enhancement layer encoding module 230, the quantization unit 231 quantizes the transformation coefficient provided by the transform unit 212 with the extended quantization parameter ($QP_N$) of Equation 2, and by entropy-encoding the quantized transformation coefficient, that is, the extended quantization level, the quantization unit 231 generates an enhancement layer bitstream. More specifically, assuming that the transformation coefficient is coef, the extended quantization level ($LEVEL_N$) can be expressed as given by Equation 4 below.

$$LEVEL_N = \frac{\text{abs}(coef) + QP_N / 2}{QP_N} \quad (4)$$

The extended quantization level ($LEVEL_N$) obtained from Equation 4 is not directly entropy-encoded, but a residue of a quantization level obtained by performing prediction encoding with the base quantization level ($LEVEL_8$), that is, a predicted quantization level, is entropy-encoded. That is, since the base quantization level ($LEVEL_8$) is very similar to the extended quantization level ($LEVEL_N$), the difference between the base quantization level ($LEVEL_8$) and the extended quantization level ($LEVEL_N$) is obtained by the bit-depth refinement unit 232 and the subtraction unit 233, and is determined as a predicted quantization level. More specifically, the bit-depth refinement unit 232 refines the dynamic range of each quantization level, and outputs a refined quantization level ($LEVEL_N'$) by making the base quantization level ($LEVEL_8$) have the same dynamic range as that of the extended quantization level ($LEVEL_N$) according to Equation 5 below.

$$LEVEL_N' = \left\lfloor \frac{QP_8 \times 2^{(N-8)}}{QP_N} \times LEVEL_8 \right\rfloor \quad (5)$$

The subtraction unit 233 obtains the residue between the extended quantization level ($LEVEL_N$) and the refined quantization level ($LEVEL_N'$), and generates a predicted quantization level ($LEVEL_P$) as given by Equation 6 below.

$$LEVEL_P = LEVEL_N - LEVEL_N' \quad (6)$$

By the entropy encoding unit 234 entropy-encoding the predicted quantization level ($LEVEL_P$) and transmitting it as an enhancement layer, the amount of data included in the enhancement layer bitstream can be greatly reduced. Meanwhile, the enhancement layer bitstream further includes additional quantization information, which can be used to refine a difference between the base layer bit-depth and the enhancement layer bit-depth. Also, when a video format of the enhancement layer is different from a video format of the base layer, additional chrominance data that can support the video format of the enhancement layer is further included.

Figure 3A:
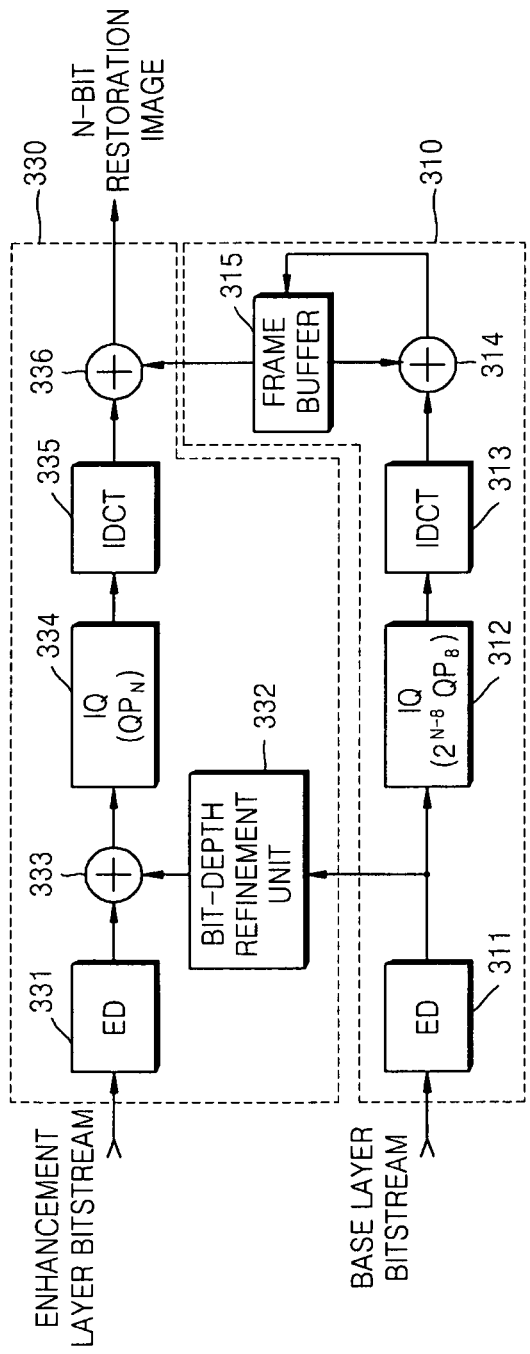
FIG. 3A is a block diagram illustrating a video decoding apparatus according to an embodiment of the present invention.

FIG. 3A is a block diagram illustrating a video decoding apparatus according to an embodiment of the present invention. The video decoding apparatus may include a base layer decoding module 310 and an enhancement layer decoding module 330, and corresponds to the video encoding apparatus illustrated in FIG. 2. The base layer decoding module 310 may include an entropy decoding unit 311, an inverse quantization unit 312, an inverse transform unit 313, an addition unit 314, and a frame buffer 315. The enhancement layer decoding module 330 may include an entropy decoding unit 331, a bit-depth refinement unit 332, an addition unit 333, an inverse quantization unit 334, an inverse transform unit 335, and an addition unit 336. Each element of the base layer decoding module 310 and the enhancement layer decoding module 330 can be implemented as at least one processor (not shown) by integrating the elements of each module into at least one module. Alternatively, the base layer decoding module 310 and the enhancement layer decoding module 330 may be integrated in order to implement one processor (not shown).

Referring to FIG. 3A, when a received bitstream is a scalable bitstream including an enhancement layer identifier, a bitstream input unit (not shown) pre-separates the scalable bitstream into a base layer bitstream and an enhancement layer bitstream and respectively provides the base layer bitstream and the enhancement layer bitstream to the entropy decoding unit 311 and the entropy decoding unit 331. When the received bitstream is a non-scalable bitstream that does not include an enhancement layer identifier, the bitstream input unit provides the received bitstream to the entropy decoding unit 311, and sets a quantization parameter of the inverse quantization unit 312 to $QP_8$.

In regard to the base layer decoding module 310, the base layer bitstream is decoded through the entropy decoding unit 311, the inverse quantization unit 312, the inverse transform unit 313, the addition unit 314, and the frame buffer 315, thereby generating an N-bit restored video. The generated N-bit restored video is stored in the frame buffer 315, and is used as a reference video not only while decoding the base layer bitstream but also while decoding the enhancement layer bitstream. Alternatively, when the non-scalable bitstream is inputted, the addition unit 314 generates an 8-bit restored video which is then stored in the frame buffer 315.

In the enhancement layer decoding module 330, the inputted enhancement layer bitstream is entropy-decoded in the entropy decoding unit 331, thereby restoring a predicted quantization level ($LEVEL_P$). The bit-depth refinement unit 332 refines the bit-depth of the base quantization level ($LEVEL_8$) restored in the entropy decoding unit 311, and generates a refined quantization level ($LEVEL_N'$). The addition unit 333 adds the predicted quantization level ($LEVEL_P$) and the refined quantization level ($LEVEL_N'$) as illustrated in Equation 7 below, and thus generates an extended quantization level ($LEVEL_N$).

$$LEVEL_N = LEVEL_P + LEVEL_N' \quad (7)$$

The inverse quantization unit 334 performs inverse-quantization of the extended quantization level ($LEVEL_N$) with the extended quantization parameter ($QP_N$) as illustrated in Equation 8 below, thereby restoring a transformation coefficient ($coef_N$).

$$coef_N = LEVEL_N \times QP_N \quad (8)$$

The inverse transform unit 335 performs inverse transformation of the restored transformation coefficient ($coef_N$), thereby restoring a residue. The addition unit 336 adds the N-bit reference video to the restored residue, thereby generating a final N-bit restored video.

Here, the enhancement layer quantization parameter ($QP_N$) may be obtained from the base quantization parameter ($QP_8$) restored from the base layer bitstream and an additional quantization information restored from the enhancement layer bitstream, such as a refined quantization parameter (R).

Figure 3B:
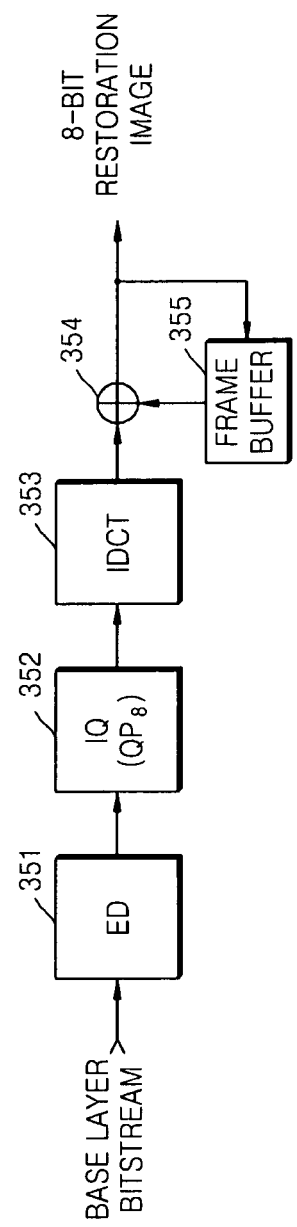
FIG. 3B is a block diagram illustrating a general video decoding apparatus, to which a scalable bitstream generated by the apparatus of FIG. 2 is input.

FIG. 3B is a block diagram illustrating a general video decoding apparatus, to which a scalable bitstream generated by the apparatus of FIG. 2 is input. The general video decoding apparatus includes an entropy decoding unit 351, an inverse quantization unit 352, a DCT inverse transform unit 353, an addition unit 354, and a frame buffer 355. The general video decoding apparatus of FIG. 3B has the same structure as the base layer decoding module 310 illustrated in FIG. 3A, except for an inverse quantization parameter used during an inverse quantization process.

Referring to FIG. 3B, a bitstream input unit (not shown) determines whether an inputted bitstream includes an enhancement layer identifier, and if the inputted bitstream is a scalable bitstream, separates a base layer bitstream from the scalable bitstream and provides the base layer bitstream to the entropy decoding unit 351.

The entropy decoding unit 351 restores a base quantization parameter ($QP_8$) by decoding the inputted base layer bitstream.

The inverse quantization unit 352 restores a transformation coefficient ($coef_8$) from the base layer bitstream by using a base quantization parameter ($QP_8$) as given by Equation 9 below.

$$coef_8 = LEVEL_8 \times QP_8 \quad (9)$$

The inverse transform unit 353 performs inverse transformation on the restored transformation coefficient ($coef_8$), thereby restoring a residue, and the addition unit 354 adds the 8-bit reference video stored in the frame buffer 355 to the restored residue, thereby generating a final 8-bit restored video.

Figure 4:
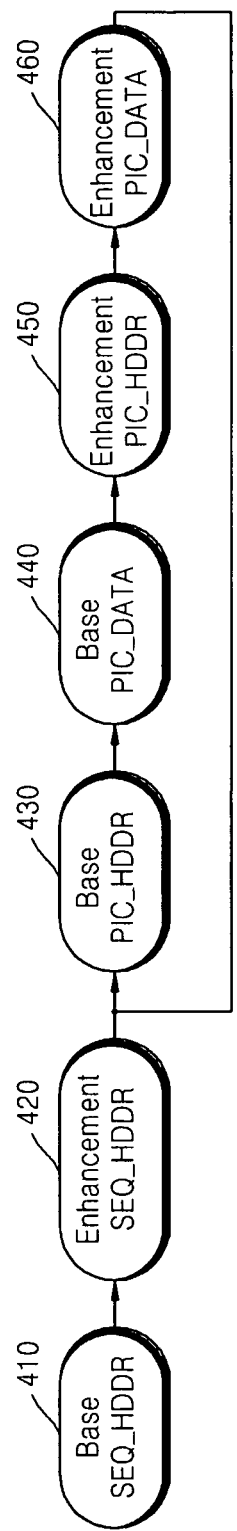
FIG. 4 is a diagram illustrating a structure of a scalable bitstream generated by a video encoding apparatus according to an embodiment of the present invention.

FIG. 4 is a diagram illustrating a structure of a scalable bitstream generated by a video encoding apparatus according to an embodiment of the present invention. The scalable bitstream is formed of the base layer bitstream generated by the base layer encoding module 210 and the enhancement layer bitstream generated by the enhancement layer encoding module 230.

Referring to FIG. 4, the scalable bitstream is constructed by combining the base layer bitstream and the enhancement layer bitstream. Basically, a sequence header (Enhancement SEQ_HDDR) 420 of an upper layer, i.e., an enhancement layer, is located after a sequence header (Base SEQ_HDDR) 410 of a lower layer, i.e., a base layer. A frame or picture header (Base PIC_HDDR) 430 of a base layer and frame or picture data (Base PIC_DATA) 440 of a base layer are respectively located after the sequence headers 410 and 420 of each layer, and then, a frame or picture header (Enhancement PIC_HDDR) 450 of an enhancement layer and frame or picture data (Enhancement PIC_DATA) 460 are respectively located thereafter. In this case, the frame or picture header 430 or 450 and frame or picture data 440 or 460 of each layer repeatedly appear up to the last frame or picture included in one video sequence. In the scalable bitstream illustrated in FIG. 4, a variety of user data or entry-point information or group of pictures (GOP) information may be further included in a predetermined location. Meanwhile, in another embodiment, an enhancement layer may be located before a base layer in relation to a frame or picture header. Here, detailed explanations of a sequence header (Base SEQ_HDDR) 410, a frame or picture header (Base PIC_HDDR) 430, a frame or picture header (Base PIC_HDDR) 430 and frame or picture data (Base PIC_DATA) 440 of a base layer forming a base layer bitstream will be omitted because these are the same as in the general video codecs.

Table 1 below explains areas for loading information related to an enhancement layer, including an enhancement layer identifier, in a scalable bitstream obtained from a video encoding apparatus according to the present invention. When the first encoder 113 is a VC-1 encoder, a start code of 4 bytes may be used in an embodiment of the present invention. In the case of the VC-1 encoder, a start code can be supported from an advanced profile or higher. Meanwhile, a start code may be included in the first area of a header of each level.

TABLE 1

| Start-CODE Suffix | BDU Type |
|---|---|
| 0x00 | SMPTE Reserved |
| 0x01-0x09 | SMPTE Reserved |
| 0x0A | end-of-Sequence |
| 0x0B | Slice |
| 0x0C | Field |
| 0x0D | Frame |
| 0x0E | Entry-point Header |
| 0x0F | Sequence Header |
| 0x10-0x1A | SMPTE Reserved |
| 0x1B | Slice Level User Data |
| 0x1C | Field Level User Data |
| 0x1D | Frame Level User Data |
| 0x1E | Entry-point Level User Data |
| 0x1F | Sequence Level User Data |
| 0x20-40, 0x41-0x7F | SMPTE Reserved |
| 0x80-0xFF | Forbidden |

Referring to table 1, a process of loading information related to an enhancement layer in a start code of the VC-1 used in an embodiment of the present invention will now be explained. Among bitstream data unit (BDU) types defined in a suffix in a start code, reserved areas reserved for future use are used for loading information related to the enhancement layer. Here, the BDU means a compression data unit that can be parsed independently of other information items in an identical layer level. For example, the BDU may be a sequence header, an entry point header, an encoded picture or a slice. Among the BDU types defined in the suffix of the start code, the remaining areas excluding a forbidden area are for loading information related to a base layer. Here, the start code is only an example, and other parts in the elements of a bitstream may also be used. Here, it is assumed that '0x00' is a first reserved area, '0x01-0x09' is a second reserved area, '0x10-0x1A' is a third reserved area, and '0x20-0x40' is a fourth reserved area.

Meanwhile, an enhancement layer includes a sequence level, a GOP level, a frame level, a field level, and a slice level. According to an embodiment of the present invention, information of the enhancement layer may be included in one of the second reserved area and the fourth reserved area. More specifically, a start code is included in a header for a sequence level of the enhancement layer as '0x09' in the second reserved area or '0x40' in the fourth reserved area. A start code is included in a header for a GOP level of the enhancement layer as '0x08' in the second reserved area or '0x3F' in the fourth reserved area. A start code is included in a header for a frame level of the enhancement layer as '0x07' in the second reserved area or '0x3E' in the fourth reserved area. A start code is included in a header for a field level of the enhancement layer as '0x06' in the second reserved area or '0x3D' in the fourth reserved area. A start code for enhancement chrominance data is included in a header for enhancement layer data as '0x06' in the second reserved area or '0x3C' in the fourth reserved area. This will now be explained in more detail.

Examples of Information items that can be included in the start code of the header for the enhancement layer sequence level which is defined as '0x09' in the second reserved area include information on an additional profile and level that can be achieved by the enhancement layer in addition to a base layer, and information on a bit-depth. More specifically, in the sequence level of the base layer, a profile is defined by 2 bits, '3' indicates an advanced profile and '0-2' indicates a reserved area. Meanwhile, a level is defined by 3 bits, '000' indicates AP@L0, '001' indicates AP@L1, '010' indicates AP@L2, '011' indicates AP@L3, '100' indicates AP@L4, and '101-111' indicates a reserved area. Information on a bit-depth that can be achieved by the enhancement layer can be expressed by a value from "N−8" (where N is the bit-depth of the enhancement layer). According to the bit-depth of the first encoder 113 illustrated in FIG. 1 corresponding to the base layer, a value other than 8 can be used. Meanwhile, N may be used without any change as bit-depth information that can be achieved by an enhancement layer. Also, enhanced video format information may be included as information on an enhancement layer. The video format information may be expressed by using a variable included in the sequence level of the base layer, for example, in the case of the VC-1 encoder, a 'COLORDIFF' variable may be used. Also, the video format information may be included as '0x09' in the second reserved area. That is, when the video format of an enhancement layer is not enhanced or when a variable of a base layer is utilized for an enhancement video format, the enhancement layer does not have to separately transmit enhanced video format information. In the example of the 'COLORDIFF' variable, '1' is used for defining a 4:2:0 video format, and '2' and '3' are specified as reserved areas. Accordingly, the variable can be used for defining a 4:2:2 video format and a 4:4:4 video format. Meanwhile, an additional hypothetical reference decoder (HRD) variable may be included as information on the enhancement layer. The HRD variable is a virtual video buffer variable which a decoder refers to for operating a buffer.

When a bit-depth or a video format does not change in units of GOPs, the start code of the header for the enhancement layer GOP level which is defined as '0x08' in the second reserved area is not necessary, and is designated as a reserved area. When the bit-depth or video format is changed in units of GOPs, the start code is necessary.

The start code for the header of the picture level, i.e., a frame level and a field level, of the enhancement layer which is defined as '0x07' and '0x06' in the second reserved area, includes additional information to indicate the bit-depth of an enhancement layer together with the bit-depth information of a base layer according to progressive or interlaced scanning. In an embodiment of the present invention, the start code includes a value of an additional quantization parameter corresponding to 'N−8' (where N is the bit-depth of the second encoder 117) when the bit-depth of the first encoder 113 is 8 bits. In this case, since an additional quantization parameter is used in units of pictures, the additional quantization parameter is included in the picture level. However, in other embodiments of the present invention, when an additional quantization parameter is used in units of slices, the additional quantization parameter is included in the slice level, when an additional quantization parameter is used in units of macroblocks, the additional quantization parameter is included in the macroblock level, and when an additional quantization parameter is used in units of blocks, the additional quantization parameter is included in the block level. In order to calculate an additional quantization parameter for each slice, macroblock or block, a process for calculating an additional quantization parameter of a picture level which will be explained later can be applied.

When the video format of the enhancement layer is not changed in comparison with the base layer, the start code for the header of the enhancement layer data which is defined as '0x05' in the second reserved area is not necessary, and therefore is designated as a reserved area. That is, when the video formats of the base layer and the enhancement layer are identically 4:2:0, data for 4 luminance blocks and 2 chrominance blocks forming one macroblock for a base layer is transmitted in the base layer, and data which is predicted by using the 4 luminance blocks and 2 chrominance blocks forming one macroblock for the base layer is transmitted in the enhancement layer. Meanwhile, when the video formats of the base layer and the enhancement layer are different from each other, for example, when the video format of the base layer is 4:2:0 and the video format of the enhancement layer is 4:2:2 or when the video format of the base layer is 4:2:0 and the video format of the enhancement layer is 4:4:4, data for 4 luminance blocks and 2 chrominance blocks for the base layer are transmitted in the base layer, and in the enhancement layer, additional data on a chrominance component is transmitted together with the data predicted by using the 4 luminance blocks and 2 chrominance blocks forming one macroblock for the base layer so that the changed video format can be supported.

Meanwhile, information related to the enhancement layer is not restricted to the start codes described in table 1, and can be included in a reserved area which is reserved for future use in a sequence level, a GOP level, a picture level, a macroblock level or a block level. Also, an enhancement layer identifier can be included in a variety of ways in a variety of layers of a network protocol or a system layer for loading and packaging a video bitstream as a payload in order to transmit the bitstream.

Figures 5, 6:
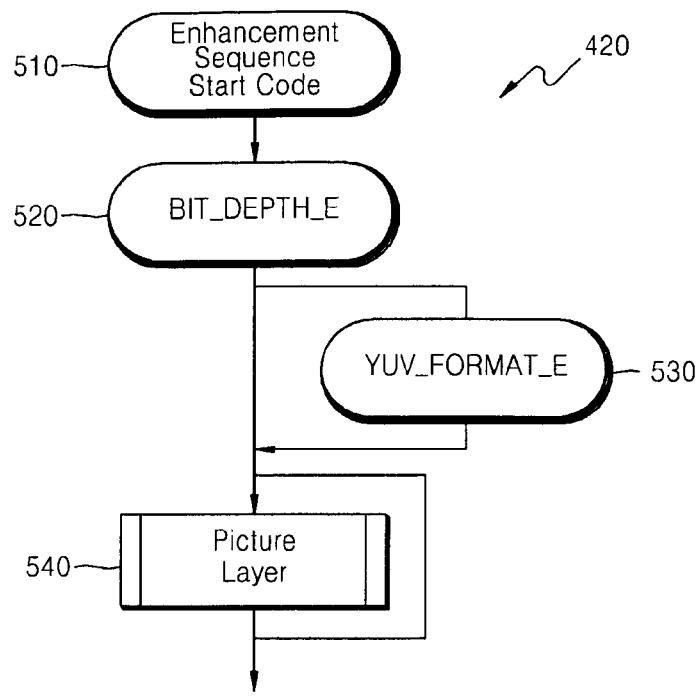
FIG. 5 is a diagram illustrating syntax of a sequence header of an enhancement layer with regard to FIG. 4 according to an embodiment of the present invention.
FIG. 6 is a table for describing a method of forming a bitstream of a sequence header of an enhancement layer, illustrated in FIG. 5 according to an embodiment of the present invention.

FIG. 5 is a diagram illustrating an example of syntax of the sequence header 420 of the enhancement layer with regard to FIG. 4.

Referring to FIG. 5, the sequence header 420 of the enhancement layer is formed of each field of a sequence start code (Enhancement Sequence Start Code) 510, a bit-depth (BIT_DEPTH_E) 520, a video format (YUV_FORMAT_E) 530, and a picture or frame layer 540. The bit-depth field 520 is information about the depth of bits forming compression data of the enhancement layer, and the video format field 530 is used to inform the video decoding apparatus whether a video format processed in the enhancement layer is YUV 4:2:2 or YUV 4:4:4. Here, the video format field 530 may not be included in the sequence header 420 of the enhancement layer when the video format field 530 can be defined in the base layer or when the video format processed in the enhancement layer is the same as a video format processed in the base layer.

FIG. 6 is a table for describing a method of forming a bitstream of the sequence header 420 of the enhancement layer, illustrated in FIG. 5. In FIG. 6, FLC is an abbreviation of a fixed length code, and denotes that the bit-depth and the video format are encoded by using a bit field of a fixed length.

Referring to FIG. 6, in the sequence header 420 of the enhancement layer, a bit-depth field (BIT_DEPTH_E) is first encoded in operation 601, it is determined whether additional video format field (YUV_FORMAT_E) is to be encoded in operation 602, and if required, the additional video format field (YUV_FORMAT_E) is encoded in operations 603 and 604. Then, a picture layer field (ENHANCEMENT_PICTURE_LAYER) of the enhancement layer is formed in operations 605 through 607 by encoding all pictures forming one sequence. Here, it is possible to form the picture layer field (ENHANCEMENT_PICTURE_LAYER) of the enhancement layer in operations 605 through 607 by encoding all frames forming one sequence.

Although not illustrated, the sequence header 410 of the base layer of FIG. 4 uses a structure used in a general video codec.

Figures 7, 8:
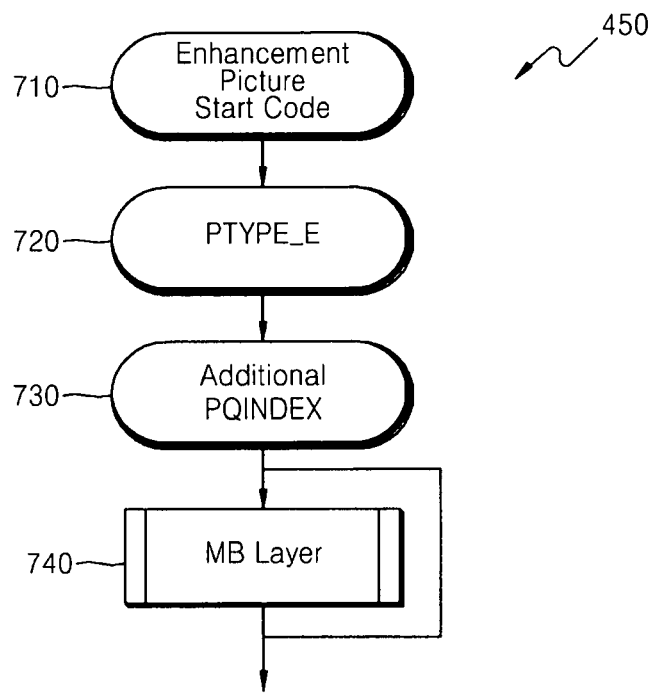
FIG. 7 is a diagram illustrating syntax of a frame header of an enhancement layer with regard to FIG. 4 according to an embodiment of the present invention.
FIG. 8 is a table for describing a method of forming a bitstream of a frame header of an enhancement layer, illustrated in FIG. 7 according to an embodiment of the present invention.

FIG. 7 is a diagram illustrating an example of syntax of the frame or picture header 450 of the enhancement layer with regard to FIG. 4.

Referring to FIG. 7, the frame or picture header 450 of the enhancement layer is formed of each field of a picture start code (Enhancement Picture Sequence Start Code) 710 of the enhancement layer, a picture type (PTYPE_E) 720, an additional quantization information (Additional QPINDEX) 730, and a macroblock layer 740. The picture type field 720 is information about a frame or picture type of the enhancement layer, and when the picture type of the enhancement layer is the same as a picture type of the base layer, the picture type field 720 is shown in a flag, and when the picture type of the enhancement layer is different from the picture type of the base layer, a code describing a corresponding frame or picture type is encoded. Here, the code uses the same variable length table. The additional quantization information field 730 is used to compensate for a difference between bit-depth of the base layer and bit-depth of the enhancement layer during the encoding, and is used later in order to obtain a quantization parameter of the base layer and a quantization parameter of the enhancement layer during decoding.

FIG. 8 is a table for describing a method of forming a bitstream of the frame or picture header 450 of the enhancement layer, illustrated in FIG. 7. In FIG. 8, VLC is an abbreviation of a variable length code, and denotes that a picture type is encoded by using a bit field of a variable length. FLC is an abbreviation of a fixed length code, and denotes that a refined quantization parameter is encoded by using a bit field of a fixed length.

Referring to FIG. 8, in the frame or picture header 450 of the enhancement layer, a picture type field (ENHANCEMENT_PTYPE) is first encoded in operation 801, and then an additional quantization information field (ADDITIONAL QPINDEX) is encoded in operation 802. Then, it is determined whether the picture type is in an intra-mode with regard to all macroblocks forming one picture or one frame, and then an intra-macroblock layer field (ENHANCEMENT_INTRA_MB) and an inter-macroblock layer field (ENHANCEMENT_INTER_MB) of the enhancement layer are formed according to the result of determination in operations 803 through 810. In detail, if the picture type field (ENHANCEMENT_PTYPE) denotes an intra-picture, all macroblocks of the enhancement layer are processed after being regarded as intra-macroblocks in operations 804 through 806. If the picture type field (ENHANCEMENT_P-TYPE) does not denote an intra-picture, all macroblocks of the enhancement layer are processed after being regarded as inter-macroblocks in operations 807 through 809. Even if the picture type information does not denote an intra-picture, and so the macroblocks are regarded as inter-macroblocks, an intra-block may be included in an inter-macroblock as will be described with reference to FIGS. 11 and 12. Meanwhile, the intra-macroblock layer field (ENHANCEMENT_INTRA_MB) and the inter-macroblock layer field (ENHANCEMENT_INTER_MB) of the enhancement layer can be formed in predicted data based on compression data forming the base layer bitstream as illustrated in FIG. 2

Figures 9, 10:
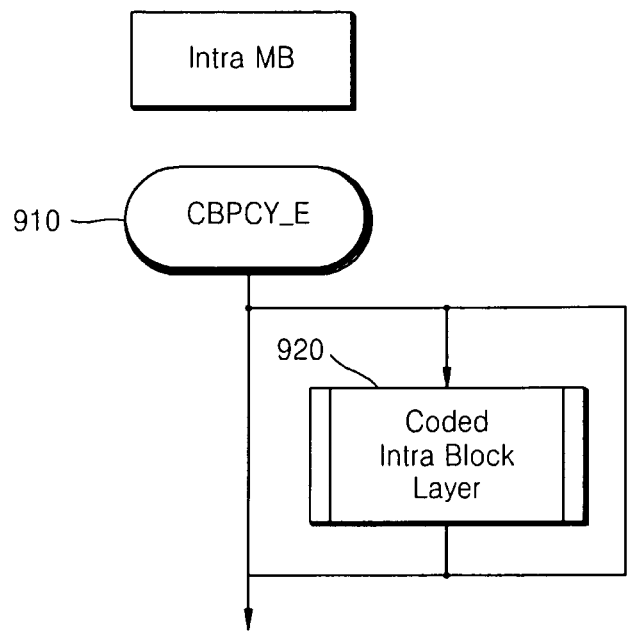
FIG. 9 is a diagram illustrating syntax of an intra-macroblock of an enhancement layer with regard to FIG. 8 according to an embodiment of the present invention.
FIG. 10 is a table for describing a method of forming a bitstream of an intra-macroblock of an enhancement layer, illustrated in FIG. 9 according to an embodiment of the present invention.

FIG. 9 is a diagram illustrating an example of syntax of the intra-macroblock (ENHANCEMENT_INTRA_MB) of the enhancement layer with regard to FIG. 8. The intra-macroblock of the enhancement layer is formed of each field of a coded block pattern (CBPCY_E) 910 and an encoded intra-block layer 920. The coded block pattern field (CBPCY_E) 910 is information about whether or not each block included in all intra-macroblocks of the enhancement layer is encoded.

FIG. 10 is a table for describing a method of forming a bitstream of the intra-macroblock of the enhancement layer, illustrated in FIG. 9. According to the method, the coded block pattern field (CBPCY_E) 910 is encoded in operation 1001, and all blocks included in the intra-macroblocks are encoded according to the coded block pattern field (CBPCY_E) 910 so as to form an encoded intra-block field (ENHANCEMENT_INTRA_BLOCK) in operations 1002 through 1006. If the coded block pattern field (CBPCY_E) 910 does not denote that the blocks included in the intra-macroblock are not encoded, only a flag informing that the corresponding intra-macroblock of the enhancement layer is the coded block pattern field (CBPCY_E) 910.

Figures 11, 12:
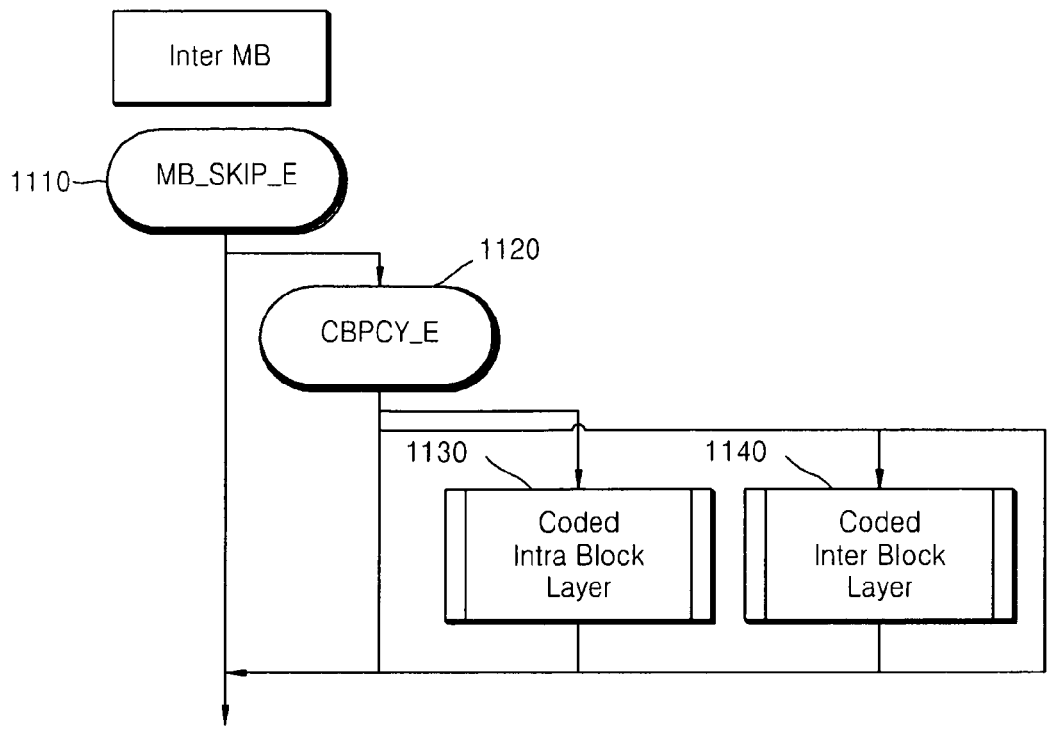
FIG. 11 is a diagram illustrating syntax of an inter-macroblock of an enhancement layer with regard to FIG. 8 according to an embodiment of the present invention.
FIG. 12 is a table for describing a method of forming a bitstream of an inter-macroblock of an enhancement layer, illustrated in FIG. 11 according to an embodiment of the present invention.

FIG. 11 is a diagram illustrating an example of syntax of the inter-macroblock (ENHANCEMENT_INTER_MB) of the enhancement layer with regard to FIG. 8. The inter-macroblock is formed of each field of a macroblock-skip (MB_SKIP_E) 1110, a coded block pattern (CBPCY_E) 1120, an encoded intra-block layer 1130, and an encoded inter-block layer 1140. The inter-macroblock of the enhancement layer shares information of an inter-macroblock of the base layer regarding whether a motion vector or a block in a macroblock is encoded by using an intra-block. The macroblock-skip field (MB_SKIP_E) 1110 is a flag indicating whether the inter-macroblock of the enhancement layer has additional data, i.e., compression data. If the inter-macroblock of the enhancement layer does not have the additional data, i.e., if all blocks in the inter-macroblock are encoded with 0, the inter-macroblock of the enhancement layer only transmits a flag called the macroblock-skip field (MB_SKIP_E) 1110. Meanwhile, when the inter-macroblock of the enhancement layer has the additional data, the encoded intra-block layer field 1130 or the encoded inter-block layer field 1140 is transmitted together with the macroblock-skip field (MB_SKIP_E) 1110 and the coded block pattern field 1120.

FIG. 12 is a table for describing a method of forming a bitstream of the inter-macroblock of the enhancement layer, illustrated in FIG. 11. First, the macroblock-skip field (MB_SKIP_E) is encoded in operation 1201, and if the macroblock-skip field (MB_SKIP_E) indicates that the inter-macroblock of the enhancement layer has the additional data, the inter-macroblock is encoded according to the coded block pattern field (CBPCY_E) that shows whether each block of the inter-macroblock of the enhancement layer is encoded, in operations 1202 through 1212. In detail, the coded block pattern field (CBPCY_E) is encoded in operation 1203, and then all blocks in the inter-macroblock are encoded according to the coded block pattern field (CBPCY_E). Here, if a block of the base layer corresponding to a certain block of the inter-macroblock of the enhancement layer is encoded with an intra-block, the corresponding block of the enhancement layer is encoded so as to form an encoded intra-block field (ENHANCEMENT_INTRA_BLOCK), and the remaining blocks that need to be encoded are blocked with an inter-block so as to form an encoded inter-block field (ENHANCEMENT_INTER_BLOCK) in operations 1204 through 1212.

Figures 13, 14:
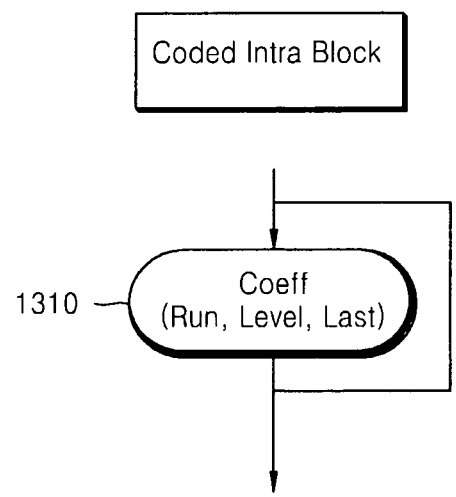
FIG. 13 is a diagram illustrating syntax of an encoded intra-block of an enhancement layer with regard to FIG. 11 according to an embodiment of the present invention.
FIG. 14 is a table for describing a method of forming a bitstream of an encoded intra-block of an enhancement layer, illustrated in FIG. 13 according to an embodiment of the present invention.

FIG. 13 is a diagram illustrating an example of syntax of the encoded intra-block of the enhancement layer with regard to FIG. 11. The encoded intra-block is formed of each field of a quantized transformation coefficient (Coeff) 1310. According to another embodiment, the quantized transformation coefficient field 1310 may be formed excluding a direct current (DC) value.

FIG. 14 is a table for describing a method of forming a bitstream of the encoded intra-block of the enhancement layer, illustrated in FIG. 13.

Referring to FIG. 14, in case of an intra-block, intra-coefficients are formed by simply performing variable length code (VLC) or entropy encoding on the quantized DCT coefficient (Coeff) field 1310 in operation 1401 through 1403. A DC value may be encoded by using a quantization parameter different from a quantization parameter used to encode an alternating current (AC) value, and is prediction-encoded from an adjacent block. Accordingly, when a DC quantization parameter of the enhancement layer is equalized to a quantization parameter of the base layer in another embodiment, a DC value is encoded in the base layer by using a method used by a general video codec, and the enhancement layer uses the DC value of the base layer, and thus a DC value that is separately quantized for the enhancement layer is not required to be encoded.

Figure 15:
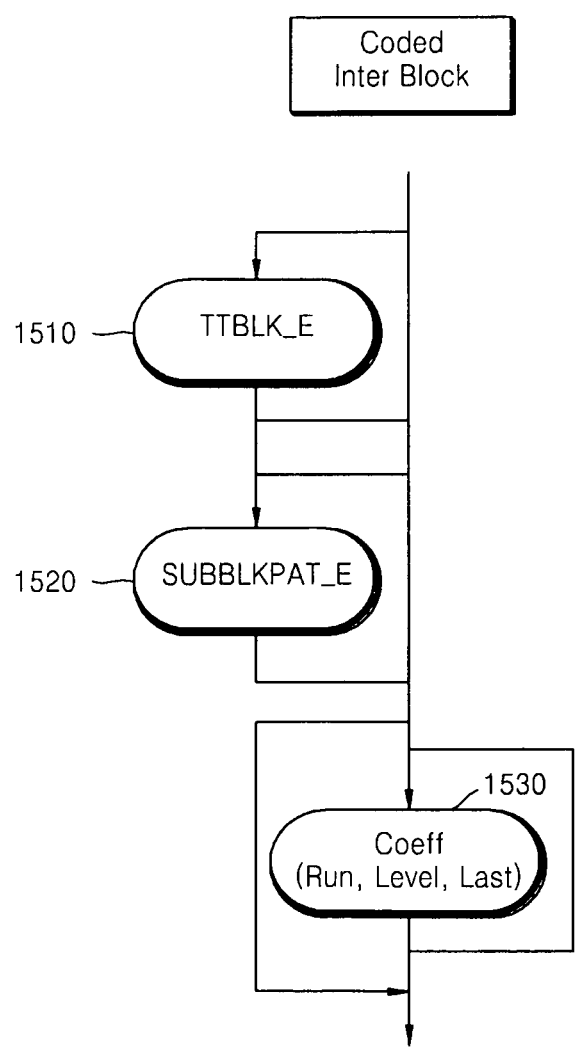
FIG. 15 is a diagram illustrating syntax of an encoded inter-block of an enhancement layer with regard to FIG. 11 according to an embodiment of the present invention.

FIG. 15 is a diagram illustrating syntax of the encoded inter-block of the enhancement layer with regard to FIG. 11. The encoded inter-block is formed of each field of a transformation type (TTBLK_E) 1510 of an inter-block of the enhancement layer, a sub-block pattern (SUBBLKPAT_E) 1520, and a quantized transformation coefficient (Coeff) 1530 of the inter-block.

FIG. 16 is a table for describing a method of forming a bitstream of the encoded inter-block of the enhancement layer, illustrated in FIG. 15.

Referring to FIG. 16, in a general video codec, a transformation type field (TTBLK_E) of each block may vary, such as 8×8, 8×4, 4×8, and 4×4. Here, when a corresponding block has a value of mode 0, the corresponding block is considered to be assigned by an 8×8 transformation type. Also in the video encoding apparatus having a hierarchical structure as shown in FIG. 2, when the enhancement layer and the base layer share a DCT block, the enhancement layer and the base layer are fundamentally encoded according to the same transformation type.

In operations 1601 through 1606 of FIG. 16, an inter-block of the base layer is not encoded but a corresponding inter-block of the enhancement layer is encoded. In detail, if it is determined that the inter-block of the base layer is not encoded in operation 1601, the transformation types of the base layer and the enhancement layer may differ and thus the transformation type field (TTBLK_E) is encoded in operation 1602 for the enhancement layer. Here, since blocks excluding an 8×8 transformation type are divided into 2 or 4, additional information, i.e. a sub-block pattern field (SUBBLKPAT_E1), which shows whether each divided sub-block is encoded, is encoded in operations 1603 through 1606 according to whether the corresponding block requires the sub-block pattern. The transformation type field (TTBLK_E) of a block is a variable which simultaneously encodes a transformation type and a coded pattern of a corresponding sub-block. The sub-block pattern field (SUBBLKPAT_E1) is a variable, in which VLC is performed, when the coded pattern field of a sub-block is additionally required.

In operations 1607 through 1609, a coded pattern of the sub-block is encoded when a transformation type of the corresponding block of the enhancement layer is known, as the block of the base layer is encoded. A sub-block pattern field (SUBBLKPAT_E2) is a variable corresponding to the coded pattern of the sub-block, in which VLC is performed. Similarly, since blocks excluding an 8×8 transformation type are separated into 2 or 4, additional information, i.e. the sub-block pattern field (SUBBLKPAT_E2), which shows whether each divided sub-block is encoded, is encoded in operations 1607 through 1609 according to whether the corresponding block requires the sub-block pattern.

In operations 1610 through 1616, all sub-blocks are encoded. Examples of transformation types of a sub-block forming a block include 8×8, 8×4, 4×8, and 4×4. In the case of 8×8, the number of sub-blocks is 1, in the case of 8×4 or 4×8, the number of sub-blocks is 2, and in the case of 4×4, the number of sub-blocks is 4. In operation 1610, blocks corresponding to the number of sub-blocks are encoded. Here, in the case of 8×8, the sub-block is encoded and in the cases of 8×4, 4×8, and 4×4, the sub-blocks, where a quantized DCT coefficient is not 0, are encoded after determining whether each sub-block is to be encoded according to the transformation type field (TTBLK_E) and the sub-block pattern field (SUBBLKPAT_E1 or SUBBLKPAT_E2) in operations 1611 through 1616. The quantized DCT coefficients of the encoded sub-block are encoded in order to form inter-coefficients in operations 1612 through 1614.

The scalable bitstream of FIG. 4, including the generated enhancement layer bitstream related to FIGS. 5 through 16, is decoded by being input to the video decoding apparatus illustrated in FIG. 3A or 3B. As a result, the base layer decoding module 310 generates a base restored video and the enhancement layer decoding module 330 generates an enhancement restored video.

The video codec applied in the embodiments described above indicates an MC-DCT video codec which is widely used in MPEG-2, MPEG4, H.264, and the like, but the present invention is not limited to this, and according to applications, modification or variation can be made. Meanwhile, since the applied video codec is widely known to those of ordinary skill in the art, a detailed explanation of the operations of known elements, except those elements which are modified or added by the present invention, are omitted here.

In addition, in the embodiments described above, the supporting of two codecs in which at least one of a bit-depth and a video format is different is explained based on the example of the scalable bitstream formed by one base layer bitstream and one enhancement layer bitstream. However, the present invention can also support two or more codecs by using a plurality of enhancement layer bitstreams. Also, although the example of the bit-depth, in which the base bit-depth is smaller than the extended bit-depth, is explained in the above embodiments, the present invention can also be applied to a different conversion direction of the bit-depth, i.e., when the base bit-depth are greater than the extended bit-depth, in various ways of changing the design. Also, in the above embodiments, an additional quantization information such as the refined QP (R) is assigned is allocated in the picture level, but when necessary, the refined QP (R) can be allocated in a slice level, a macroblock level, or a block level.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, in order to provide a new video codec guaranteeing forward compatibility, a video encoder generates a scalable bitstream formed with a base layer bitstream and an enhancement layer bitstream. Then, a conventional base decoder which receives the scalable bitstream decodes the scalable bitstream, by using the base layer bitstream obtained from the scalable bitstream, and an improved decoder decodes the scalable bitstream, by using both the base layer bitstream and the enhancement layer bitstream. In this way, both the improved video codec and the conventional video code share the scalable bitstream in a harmonized way. More specifically, according to the present invention, a conventional Windows Media Video (WMV) codec or VC-1 codec can be used together with a new video codec supporting a new bit-depth and a new video format.

Thus, since the video codec according to the present invention provides the forward compatibility, the present invention can be applied to a variety of video codecs regardless of a supported bit-depth or video format, for example, to the conventional basic video codecs as well as improved video codecs mounted on a wired or wireless electronic device, such as a mobile phone, a DVD player, a portable music player, or a car stereo unit.

Also, a video encoding apparatus according to the present invention efficiently forms an enhancement layer bitstream included in a scalable bitstream, and thus can efficiently use information about a base layer while encoding the enhancement layer bitstream. As a result, a conventional video codec also can decode a scalable bitstream generated by the video codec according to the present invention, and thus the video codec according to the present invention can harmonize and thereby coexist with conventional video codecs.

Thus, since the video codec according to the present invention provides the forward compatibility, the present invention can be applied to a variety of video codecs regardless of a supported bit-depth or video format, for example, to the conventional basic video codecs as well as improved video codecs mounted on a wired or wireless electronic device, such as a mobile phone, a DVD player, a portable music player, or a car stereo unit.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A video encoding method, the method comprising:
generating a base layer bitstream and an enhancement layer bitstream, respectively; and
generating a scalable bitstream comprising the base layer bitstream and the enhancement layer bitstream so as to have forward compatibility,
wherein the enhancement layer bitstream comprises:
a bit-depth field of an enhancement layer;
a frame or a picture type field of the enhancement layer in consideration of a frame or a picture type of a base layer;
an additional quantization information field including a value compensating for a difference between a base layer bit-depth and an enhancement layer bit-depth, such that a quantization parameter of the enhancement layer is obtained by using the value and a quantization parameter of the base layer during decoding;
an intra-macroblock field of the enhancement layer; and
an inter-macroblock field of the enhancement layer.

2. The video encoding method of claim 1, wherein the enhancement layer bitstream further comprises a video format field of the enhancement layer.

3. The video encoding method of claim 1, wherein the frame or the picture type field of the enhancement layer is encoded according to a result of determining whether the frame or the picture type of the base layer is the same as the frame or the picture type of the enhancement layer.

4. The video encoding method of claim 1, wherein the intra-macroblock field of the enhancement layer and the inter-macroblock field of the enhancement layer comprise data that is predicted from compression data forming the base layer bitstream.

5. The video encoding method of claim 1, wherein the inter-macroblock field of the enhancement layer is encoded by sharing information of an inter-macroblock of the base layer.

6. The video encoding method of claim 1, wherein an intra-block of the inter-macroblock field of the enhancement layer is encoded by sharing information of an intra-block of the base layer.

7. The video encoding method of claim 1, wherein an inter-block of the inter-macroblock field of the enhancement layer is encoded by sharing information of an inter-block of the base layer.

8. The video encoding method of claim 1, wherein when additional information, excluding a sub-block coded pattern, of a block of the enhancement layer and a block of the base layer corresponding thereto is the same, only the sub-block coded pattern of the block of the enhancement layer is encoded to be included in the enhancement layer bitstream.

9. The video encoding method of claim 1, wherein a coded block pattern for indicating whether or not all blocks of a macroblock of the enhancement layer are encoded is separately encoded to be included in the enhancement layer bitstream.

10. The video encoding method of claim 1, wherein when a block of the base layer corresponding to a block of the enhancement layer is not encoded, additional information including a transformation type and a sub-block coded pattern of the block of the enhancement layer is included in the enhancement layer bitstream.

11. The video encoding method of claim 1, wherein the value included in the additional quantization information field is used to obtain the quantization parameter of the enhancement layer together with a quantization parameter of the base layer.

12. A video encoding apparatus which generates a scalable bitstream comprising a base layer bitstream and an enhancement layer bitstream so as to have forward compatibility, the apparatus comprising:
an enhancement layer encoding module, which generates the enhancement layer bitstream comprising a bit-depth field of an enhancement layer, a frame or a picture type field of the enhancement layer in consideration of a frame or a picture type of an base layer, an additional quantization information field including a value compensating for a difference between a base layer bit-depth and an enhancement layer bit-depth, such that a quantization parameter of the enhancement layer is obtained by using the value and a quantization parameter of the base layer during decoding, an intra-macroblock field of the enhancement layer, and an inter-macroblock field of the enhancement layer.

13. A video decoding method which decodes a scalable bitstream comprising a base layer bitstream and an enhancement layer bitstream so as to have forward compatibility, the method comprising:
receiving the base layer bitstream and decoding video compression data; and
receiving the enhancement layer bitstream, decoding a bit-depth field of an enhancement layer, decoding a frame or a picture type field of the enhancement layer encoded in consideration of a frame or a picture type of a base layer, decoding an additional quantization information field of the enhancement layer including a value compensating for a difference between a base layer bit-depth and an enhancement layer bit-depth, wherein a quantization parameter of the enhancement layer is obtained by using the value and a quantization parameter of the base layer, and decoding an intra-macroblock field of the enhancement layer and an inter-macroblock field of the enhancement layer by using results of the decoding of the base layer bitstream.

14. The video decoding method of claim 13, wherein the decoding of the enhancement layer bitstream further comprises decoding a video format field of the enhancement layer.

15. The video decoding method of claim 13, wherein the frame or the picture type field of the enhancement layer is decoded according to a result of determining whether the frame or the picture type of the base layer is the same as the frame or the picture type of the enhancement layer.

16. The video decoding method of claim 13, wherein the inter-macroblock field of the enhancement layer is decoded by sharing information of an inter-macroblock of the base layer.

17. The video decoding method of claim 13, wherein an intra-block field of the inter-macroblock field of the enhancement layer is decoded by sharing information of an intra-block of the base layer.

18. The video decoding method of claim 13, wherein an inter-block field of the inter-macroblock field of the enhancement layer is decoded by sharing information of an inter-block of the base layer.

19. The video decoding method of claim 13, wherein when additional information, excluding the sub-block coded pattern, of a block of the enhancement layer and a block of the base layer corresponding thereto is the same, the additional information of the block formed of only the sub-block coded pattern of the block of the enhancement layer is decoded.

20. The video decoding method of claim 13, wherein a coded block pattern for indicating whether or not all blocks of a macroblock of the enhancement layer are encoded is separately decoded for the enhancement layer.

21. The video encoding apparatus of claim 13, wherein when a block of the base layer corresponding to a block of the enhancement layer is not decoded, additional information including a transformation type and a sub-block coded pattern of the block of the enhancement layer included into the enhancement layer bitstream is decoded.

22. The video decoding method of claim 13, wherein the value included in the additional quantization information field is used to obtain the quantization parameter of the enhancement layer together with a quantization parameter of the base layer.

23. The video decoding method of claim 13, wherein base and extended quantization levels are obtained using a quantization parameter of the base layer and a quantization parameter of the enhancement layer, respectively, and
wherein the quantization levels are compensated for such that the base quantization level has the same dynamic range as the extended quantization level.

24. The video decoding method of claim 13, wherein when a video format of the enhancement layer is different from a video format of the base layer, additional chrominance data that supports the video format of the enhancement layer is included in the enhancement layer.

25. A video decoding apparatus which decodes a scalable bitstream comprising a base layer bitstream and an enhancement layer bitstream so as to have forward compatibility, the apparatus comprising:
a base layer decoding module, which receives the base layer bitstream and decodes video compression data; and an enhancement layer decoding module, which receives the enhancement layer bitstream, decodes a bit-depth field of the enhancement layer, decoding a bit-depth field of an enhancement layer, decoding a frame or a picture type field of the enhancement layer encoded in consideration of a frame or a picture type of a base layer, decoding an additional quantization information field of the enhancement layer including a value compensating for a difference between a base layer bit-depth and an enhancement layer bit-depth, wherein a quantization parameter of the enhancement layer is obtained by using the value and a quantization parameter of the base layer, and decodes an intra-macroblock field of the enhancement layer and an inter-macroblock field of the enhancement layer by using results of the decoding of the base layer bitstream.

26. A non-transitory computer readable medium having computer readable code to implement a method which decodes a scalable bitstream comprising a base layer bitstream and an enhancement layer bitstream so as to have forward compatibility, wherein the enhancement layer bitstream comprises:

a bit-depth field of the enhancement layer;

a frame or a picture type field of an enhancement layer in consideration of a frame or a picture type of a base layer;

an additional quantization information field including a value compensating for a difference between a base layer bit-depth and an enhancement layer bit-depth, such that a quantization parameter of the enhancement layer is obtained by using the value and a quantization parameter of the base layer;

an intra-macroblock field of the enhancement layer; and an inter-macroblock field of the enhancement layer.

* * * * *

UNITED STATES PATENT AND TRADEMARK OFFICE
CERTIFICATE OF CORRECTION

PATENT NO. : 8,873,621 B2  
APPLICATION NO. : 12/076125  
DATED : October 28, 2014  
INVENTOR(S) : Dae-hee Kim et al.

Page 1 of 1

It is certified that error appears in the above-identified patent and that said Letters Patent is hereby corrected as shown below:

In the Claims

Column 19, Line 46, In Claim 12, delete "an" and insert -- a --, therefor.
Column 20, Line 38, In Claim 21, delete "video encoding apparatus" and insert -- video decoding method --, therefor.
Column 21, Line 3, In Claim 25, delete "the" and insert -- an --, therefor.
Column 22, Line 5, In Claim 26, delete "the" and insert -- an --, therefor.
Column 22, Line 6, In Claim 26, delete "an" and insert -- the --, therefor.

Signed and Sealed this
Eighth Day of September, 2015

Michelle K. Lee
*Director of the United States Patent and Trademark Office*